(12) United States Patent
Saccomanno

(10) Patent No.: US 6,485,164 B2
(45) Date of Patent: Nov. 26, 2002

(54) LIGHTING DEVICE WITH PERPETUALLY CLEAN LENS

(75) Inventor: Robert J. Saccomanno, Montville, NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/884,380

(22) Filed: Jun. 19, 2001

(65) Prior Publication Data

US 2002/0034075 A1 Mar. 21, 2002

Related U.S. Application Data

(60) Provisional application No. 60/234,383, filed on Sep. 20, 2000.

(51) Int. Cl.[7] ............................................. F21V 17/02
(52) U.S. Cl. ....................... 362/280; 362/284; 362/320; 362/551
(58) Field of Search ................................ 362/277, 278, 362/279, 280, 284, 319, 320, 551

(56) References Cited

U.S. PATENT DOCUMENTS

| 1,777,524 | A | * | 10/1930 | Doyle | 431/189 |
| 3,852,109 | A | | 12/1974 | Cheetham | 134/9 |
| 4,268,045 | A | | 5/1981 | Traub | 277/121 |
| 4,331,993 | A | | 5/1982 | Pfost et al. | 360/137 |
| 4,360,579 | A | * | 11/1982 | Klose et al. | 352/236 |
| 4,501,486 | A | | 2/1985 | Landa | 355/15 |
| 4,616,060 | A | | 10/1986 | Killgoar, Jr. | 524/574 |
| 6,139,161 | A | * | 10/2000 | Honda et al. | 362/17 |

* cited by examiner

Primary Examiner—Sandra O'Shea
Assistant Examiner—John Anthony Ward
(74) Attorney, Agent, or Firm—Michele M. Burris; Loria B. Yeadon

(57) ABSTRACT

An outdoor lighting fixture or luminaire includes an enclosure having within it a light source for projecting light through an opening in the enclosure and a motor train for slowly moving a transparent plastic film across the opening and over the light emitting surface of the light source, thereby preventing the light emitting surface or lens from becoming dirty over time.

14 Claims, 2 Drawing Sheets

LIGHTING DEVICE WITH PERPETUALLY CLEAN LENS

CROSS-REFERENCE TO RELATED APPLICATIONS

The present application claims the priority of U.S. Provisional Application No. 60/234,383, entitled LIGHTING DEVICE WITH PERPTUALLY CLEAN LENS, filed on Sep. 20, 2000, the entirety of which is incorporated by reference herein.

FEDERALLY SPONSORED RESEARCH OR DEVELOPMENT

Not Applicable

BACKGROUND OF THE INVENTION

1. Technical Field

This invention relates to outdoor lighting fixtures and more specifically to methods of maintaining clean light emitting surfaces or lenses on such devices.

2. Background Art

Luminaires, such as outdoor street lighting fixtures, are exposed to environmental pollution and dirt and dust. Many of these luminaires are not easily accessible for cleaning. In environments, classified as very dirty, a typical luminaire can lose 50% efficiency due to dirt within 24 months unless it is periodically cleaned. This loss of efficiency represents a large amount of wasted energy in the United States and other countries every year.

There is thus a need for the automatic cleaning of luminaires, such as outdoor street lighting fixtures.

SUMMARY OF THE INVENTION

The human eye maintains clean lenses by a constant fluid washing from the tear ducts. This approach, using a fluid wash in front of a lens, is not practical for luminaire lenses that have a long-term exposure (>1 year) to the environment without cleaning. My invention substitutes a plastic film over a lens for the same function that tears accomplish in the human eye.

An automatic plastic film feed device is placed in front of a light source. This plastic film is constantly moving, but at a very slow rate (~1 inch per month). Dirt and pollution from the environment are deposited on this plastic film instead of on lenses or other clear light emitting surfaces that are now placed in front of typical light sources.

The buildup of dirt on a lens from the environment is a fairly slow process and the lumen dirt depreciation factor (LDD) can be approximated by a formula provided in the Illumination Engineering Society of North America Lighting Handbook, 9th Edition as follows:

$$LDD = e^{-[At]^B} \quad \text{(Eq.1)}$$

where A is a constant that represents the cleanliness of the environment and varies in a range from 0.038 to 0.396; B is a constant that represents the category of the luminaire and varies in a range from 0.53 to 0.88; and where t represents time in decimal years.

A lighting fixture in accordance with my invention is especially suitable for light areas where it either is inconvenient or impossible to change light sources or lenses, such as nuclear reactors or tunnels. Advantageously, this invention can be combined with a remote light source where light is provided to the apparatus via fiber optic cable, thereby allowing for the light source to be changed without access to the lighting enclosure required. Also advantageously, my invention can be powered by a spring-powered motor, such as is used in a clock or a child's wind-up toy so that neither external power supply nor batteries, which are prone to chemical leakage, are required.

DETAILED DESCRIPTION OF THE INVENTION

Figure 1:
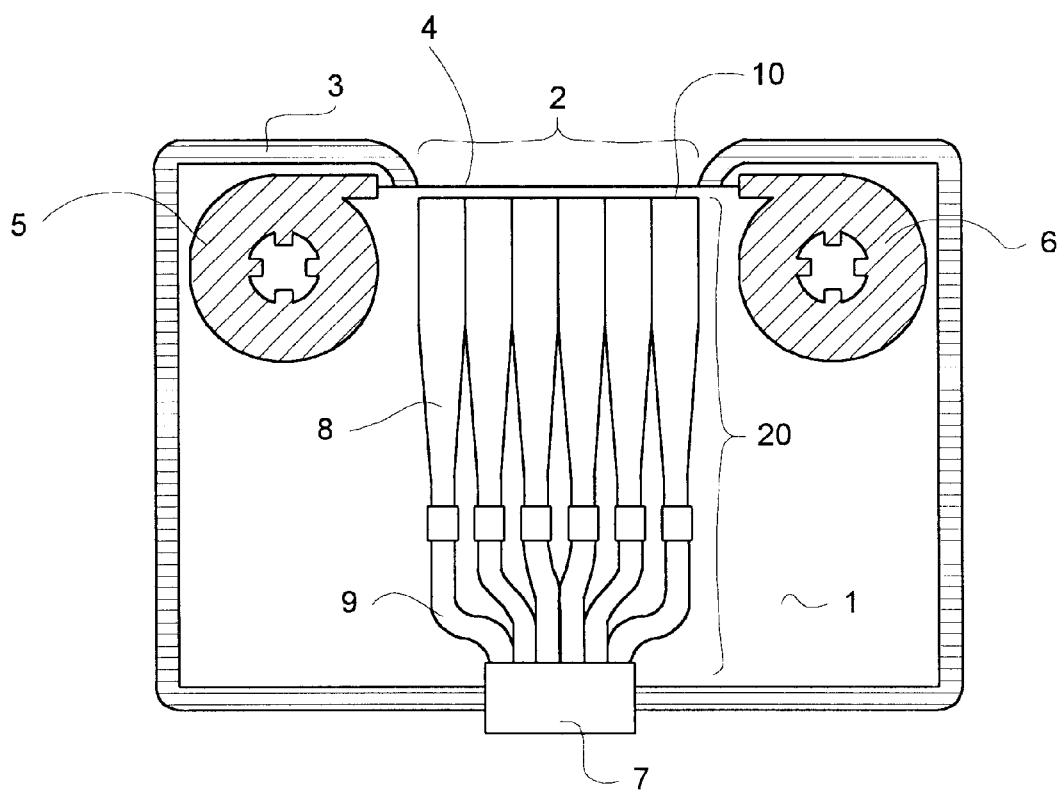
FIG. 1 illustrates a lighting fixture in accordance with an illustrative embodiment of my invention.

Referring to FIG. 1, a lighting enclosure 1 with a perpetually clean lighting surface or lens in accordance with an illustrative embodiment of my invention is shown. The lighting enclosure 1 is preferably manufactured from a material that is durable when exposed to an outdoor environment, such as aluminum or UV-resistant plastic. Such materials are well known in the art. The lighting enclosure 1 encloses a light source 20, located therein, and has an opening 2 on one sidewall 3 that is preferably square or round-shaped although other shapes can be used as well. A thin transparent plastic film 4, such as polyethylene, polyester, or a fluoropolymer, is strung across and completely covers the opening 2 at the inside surface of the sidewall 3. It is preferable that the transparent plastic film 4 is provided with an antireflective coating in order to minimize fresnel reflection losses. The film should not soil easily, either through inherent anti-stick properties of fluoropolymer films, or by avoiding the attractive nature as a result of static buildup. Such buildup can be minimized by employing conductive coatings or additives in the bulk polymer. The sidewall 3 preferably provides a conductive path for the discharge of residual static buildup on plastic film 4. It is further preferred that the transparent plastic film resists stretching. The transparent plastic film 4 is supplied in the form of a roll and is pulled from a clean film supply reel 5 to a film take-up reel 6.

Figure 2:
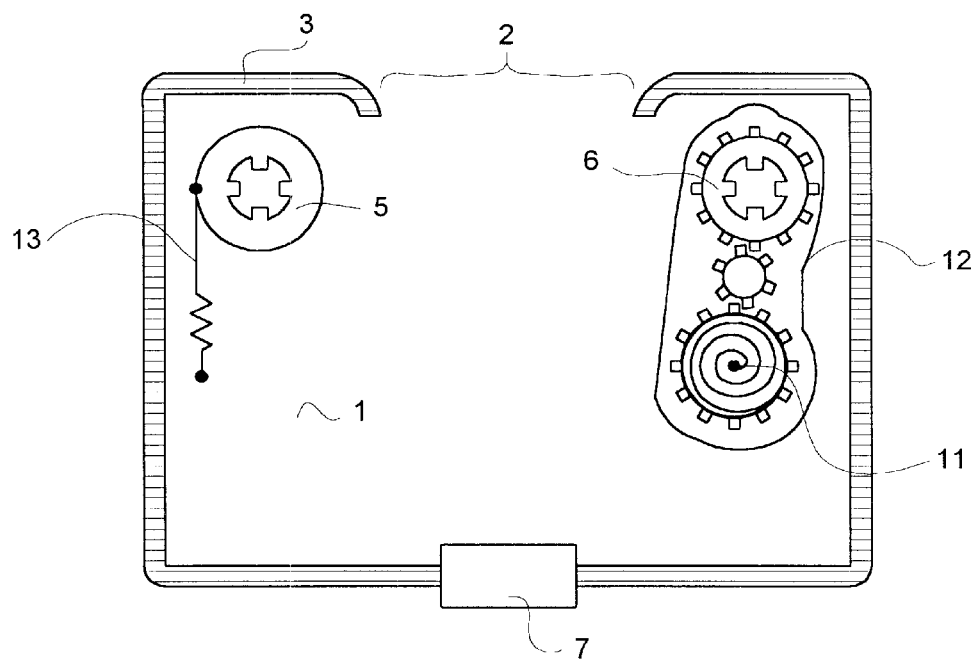
FIG. 2 illustrates a spring-powered motor and a gear drive that may be employed in the embodiment of FIG. 1.

As depicted in FIG. 2, the film take up reel 6 is driven in a circular motion by a constant speed spring-powered motor 11 and a gear train 12 in order to pull the transparent film 4 from the clean film supply reel 5. In this embodiment, the clean film supply reel 5 is equipped with an automating tensioning device 13 in order to maintain tension on the transparent plastic film 4 as it moves across the opening 2. The spring-powered motor 11 and the gearing ratio of the drive gears of the gear train 12 determine the speed at which the transparent plastic film 4 is pulled across the opening 2. The film 4 is preferably pulled at a speed to meet or exceed the LDD requirements. In one embodiment of my invention, a 25-foot long roll of transparent plastic film 4 is provided and the spring-powered motor 11 and gear train 12 are set to pull the film at 1 inch per month. The apparatus resulting from this embodiment of my invention has, therefore, a 25-year operational life.

In certain embodiments of my inventions, built up debris such bird droppings and ice are removed from the film 4 by using devices known in the art such as scrapers. These prior art devices are not further discussed herein.

Referring again to FIG. 1, in this illustrative embodiment of my invention, light is supplied to the lighting enclosure 1 via a plurality of external fiber optic cables (not shown) that are connected to an optical coupling connector 7, which delineates light source 20 within the enclosure. Light is then fed from the fiber optic connector 7 to an array of optical waveguides 8 via connecting fiber optic cables 9. The array of optical waveguides 8 has a flat surface 10 that allows for the movement of transparent plastic film 4 with minimal friction, the flat surface 10 serving as the light emitting surface or lens of the lighting fixture or luminaire in this embodiment.

In alternate embodiments of my invention, mechanisms other than optical waveguides 8 and connecting fiber optic cables, such as a direct lens system, may be used to transmit light from the optical coupling connector 7 through the transparent plastic film 4. In even other embodiments of my invention, a long-life light source is placed within the lighting enclosure 1, and the optical coupling connector and the connecting fiber optic cables 9 are replaced with a power connector for the light source.

In order to operate my invention, the roll of transparent plastic film 4 is loaded onto the clean film supply reel 5 and one end of the plastic film 4 is threaded across the opening 2 in the lighting enclosure 1 and affixed to the film take up reel 6. The spring-powered motor 11 is wound and then allowed to rotate, causing the film take up reel to slowly rotate. The rotation speed of the film take up reel is determined by the gear train 12 and is set according to the cleanliness of the environment and the size of the opening. As noted above, the rotation speed may advantageously be set to pull the transparent plastic film across the opening at 1 inch per month.

Alternate embodiments may be devised without departing from the spirit or the scope of the invention.

What is claimed is:

1. A lighting fixture providing a perpetually clean light emitting surface, said fixture comprising:
   an enclosure having an opening in one wall thereof;
   a light source providing a light emitting surface adjacent said opening and within said enclosure;
   a clean film supply reel within said enclosure and having a roll of transparent plastic film loaded thereon, said supply reel being located at one side of said opening;
   a film take up reel within said enclosure and located on the opposite side of said opening; and
   a motor and gear train for driving said take up reel to pull said plastic film across said light emitting surface and completely covering said opening.

2. The lighting fixture of claim 1, wherein said enclosure comprises a material that is durable when exposed to an outdoor environment.

3. The lighting fixture of claim 1, wherein said transparent plastic film is selected from the group consisting of polyethylene, polyester, or a fluoropolymer, and is coated with an antireflective coating.

4. The lighting fixture of claim 1, further comprising a tensioning device connected to said clean film supply reel.

5. The lighting fixture of claim 1, wherein said motor is a spring-powered motor.

6. The lighting fixture of claim 1, wherein said motor and gear train are designed to pull said transparent plastic at the rate of 1 inch per month.

7. The lighting fixture of claim 1, wherein said transparent plastic film is treated UV-resistant polyethylene.

8. A lighting system with a perpetually clean lens comprising:
   a light source;
   an enclosure including a sidewall with an opening located therethrough, wherein said light source is installed within said enclosure;
   a clean film supply reel including a roll of transparent plastic film thereupon loaded,
   a film take up reel, wherein said transparent plastic film is pulled from the clean film supply reel to said film take up reel across said opening;
   a tensioning device connected to said clean film supply reel; and
   a motor and gear train, where said motor and gear train for driving said film take up reel to pull said transparent plastic film, said transparent plastic film completely covering said opening and the light source projecting light through said transparent plastic film.

9. The lighting system of claim 8 wherein said enclosure comprises a material that is durable when exposed to an outdoor environment.

10. The lighting system of claim 8 wherein said transparent plastic film comprises UV-resistant plastic and is coated with a antireflective coating.

11. The lighting system of claim 8, wherein said light source comprises:
    an optical coupling connector attached externally to and penetrating within said enclosure; and
    an array of optical waveguides providing a light emitting flat surface adjacent said opening and receiving light from said optical coupling connector, said transparent plastic film being pulled across said flat light emitting surface.

12. The lighting system of claim 11, further comprising:
    a plurality of fiber optic cables disposed between and forming optically connective paths between said optical coupling connector and said array of optical waveguides.

13. A method for maintaining a perpetually clean lens on a lighting enclosure with an opening, a clean film supply reel, and a film take up reel comprising:
    loading a roll of transparent plastic film on the clean film supply reel;
    threading said transparent film across the opening in the lighting enclosure;
    affixing one end of the transparent film to said take up reel; and
    pulling said transparent plastic film across the opening at a predetermined rate, said predetermined rate selected as required to maintain a perpetually clean lens for said opening in an external environment with a predefined cleanliness.

14. The method of claim 13, wherein said predetermined rate is 1 inch per month.

* * * * *